Sept. 2, 1941.  R. E. ZERUNEITH  2,254,256
SAFETY CONTROL
Filed Aug. 14, 1939  7 Sheets-Sheet 1
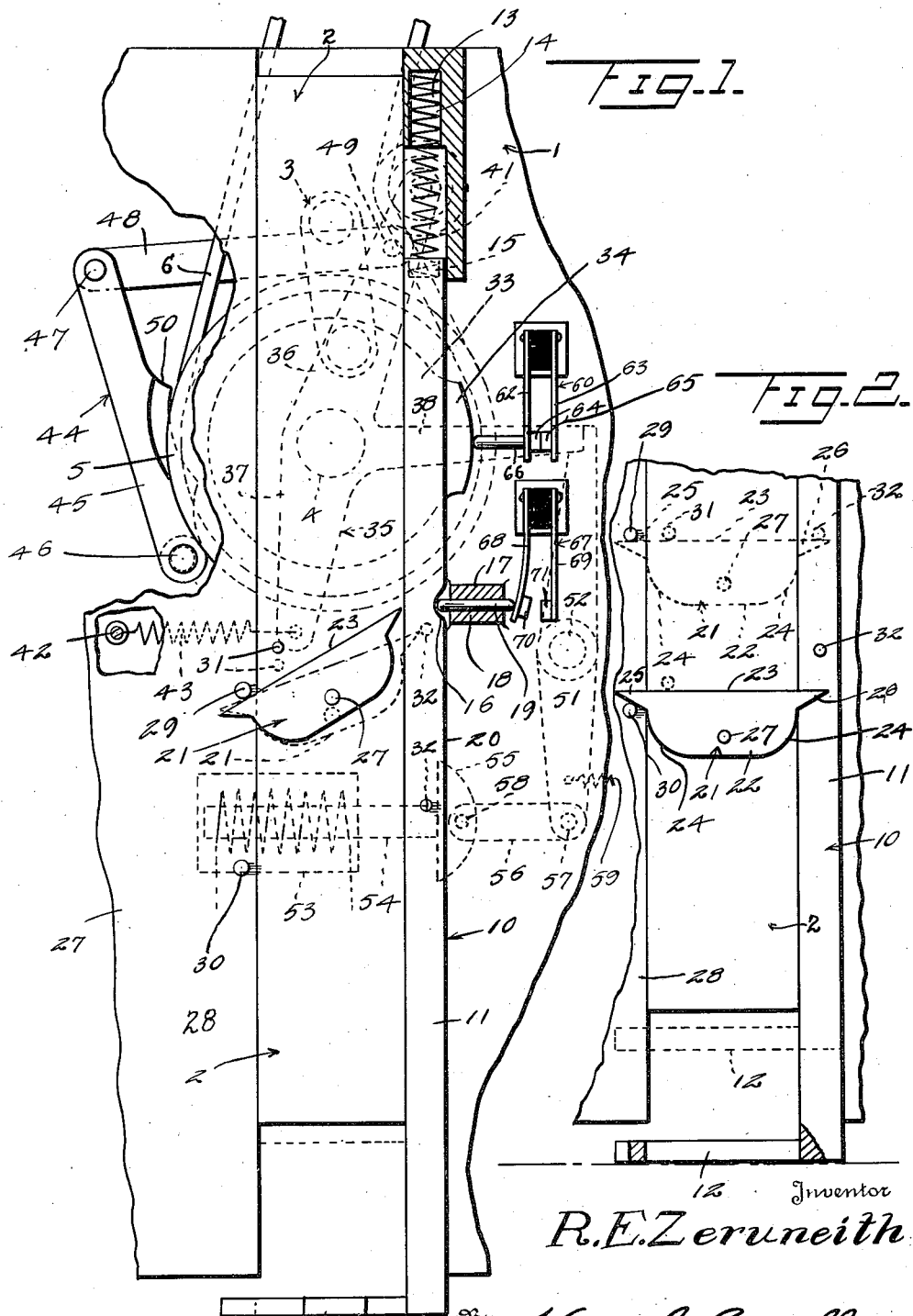
Inventor
R. E. Zeruneith
By Kimmel & Crowell
Attorneys

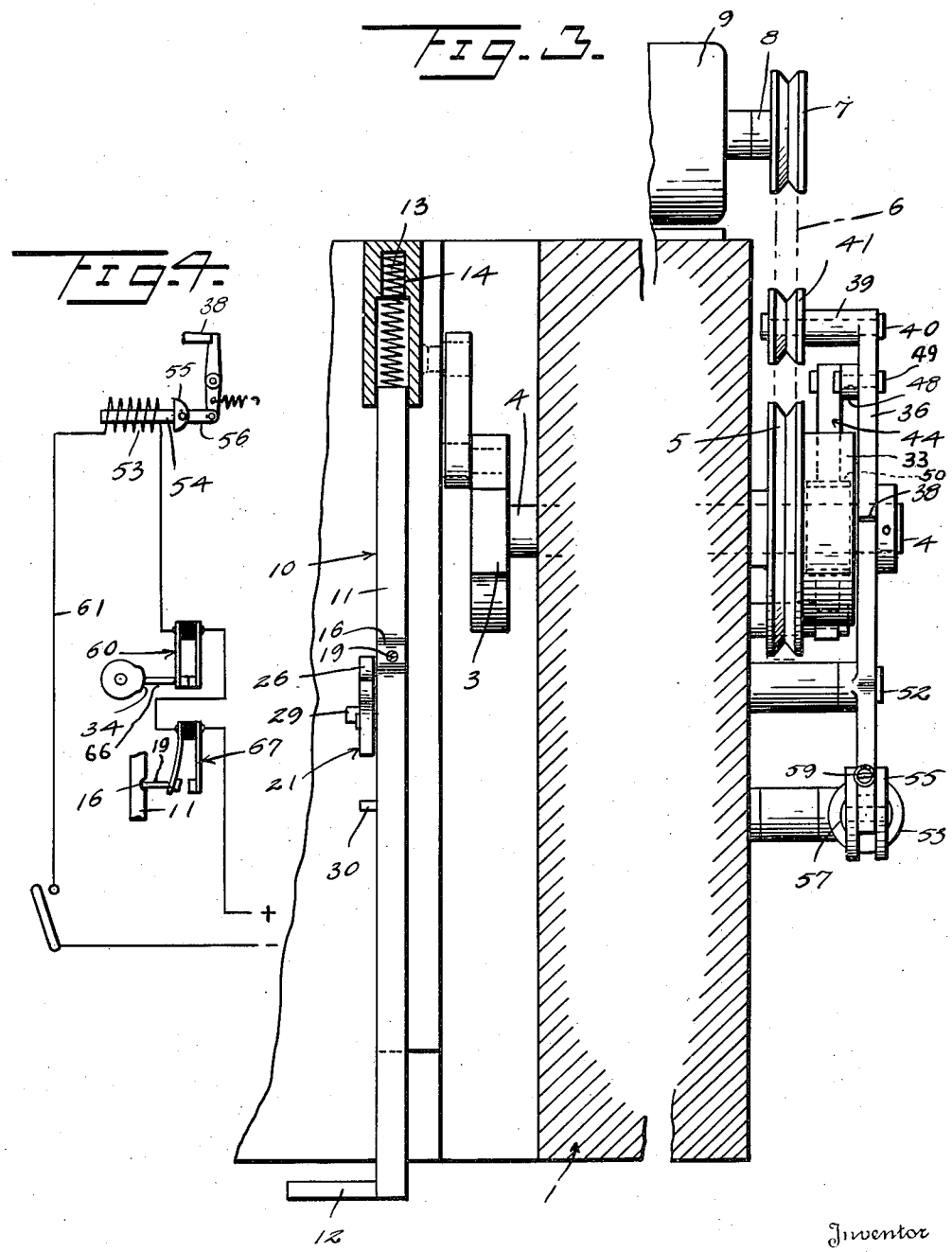

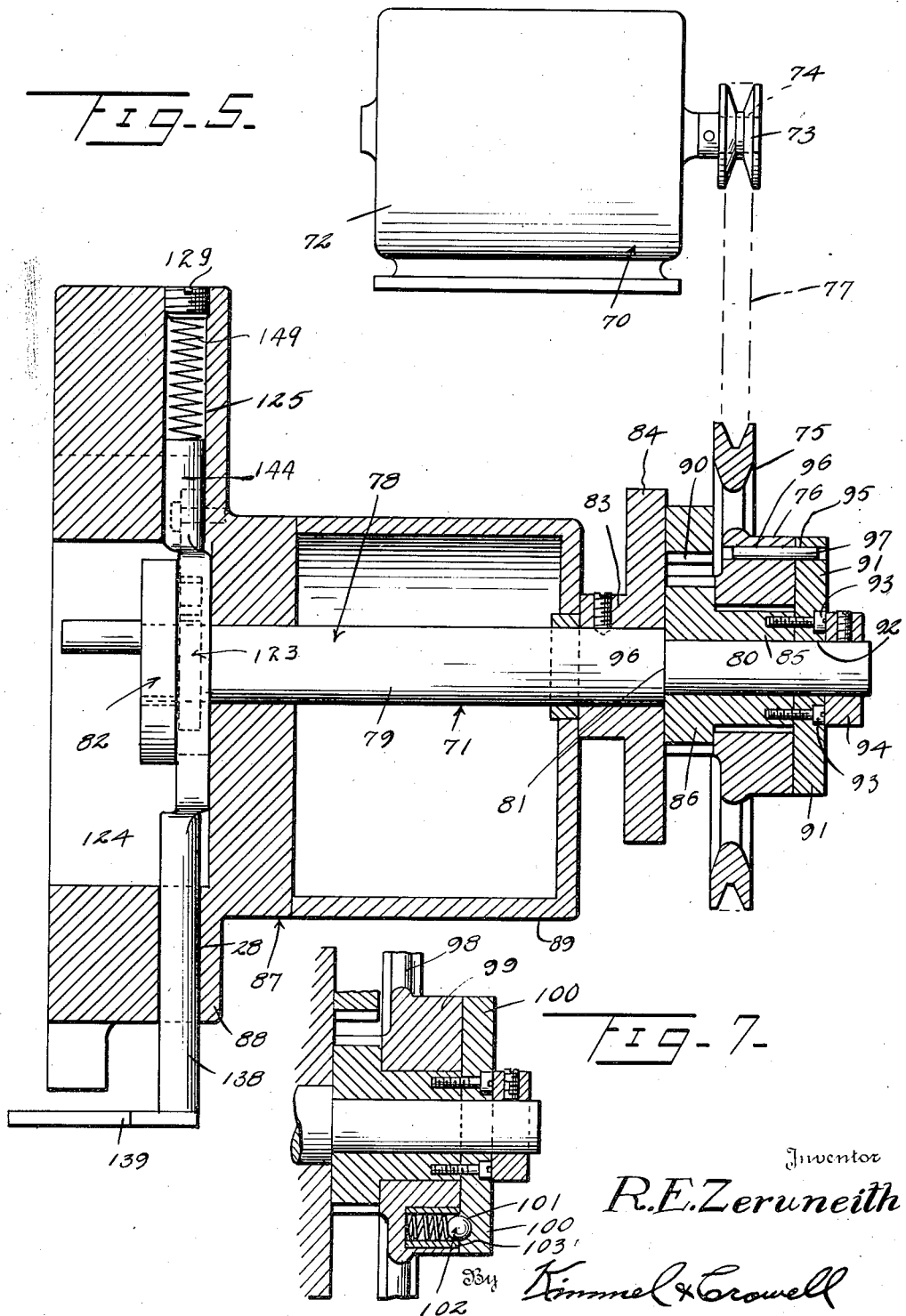

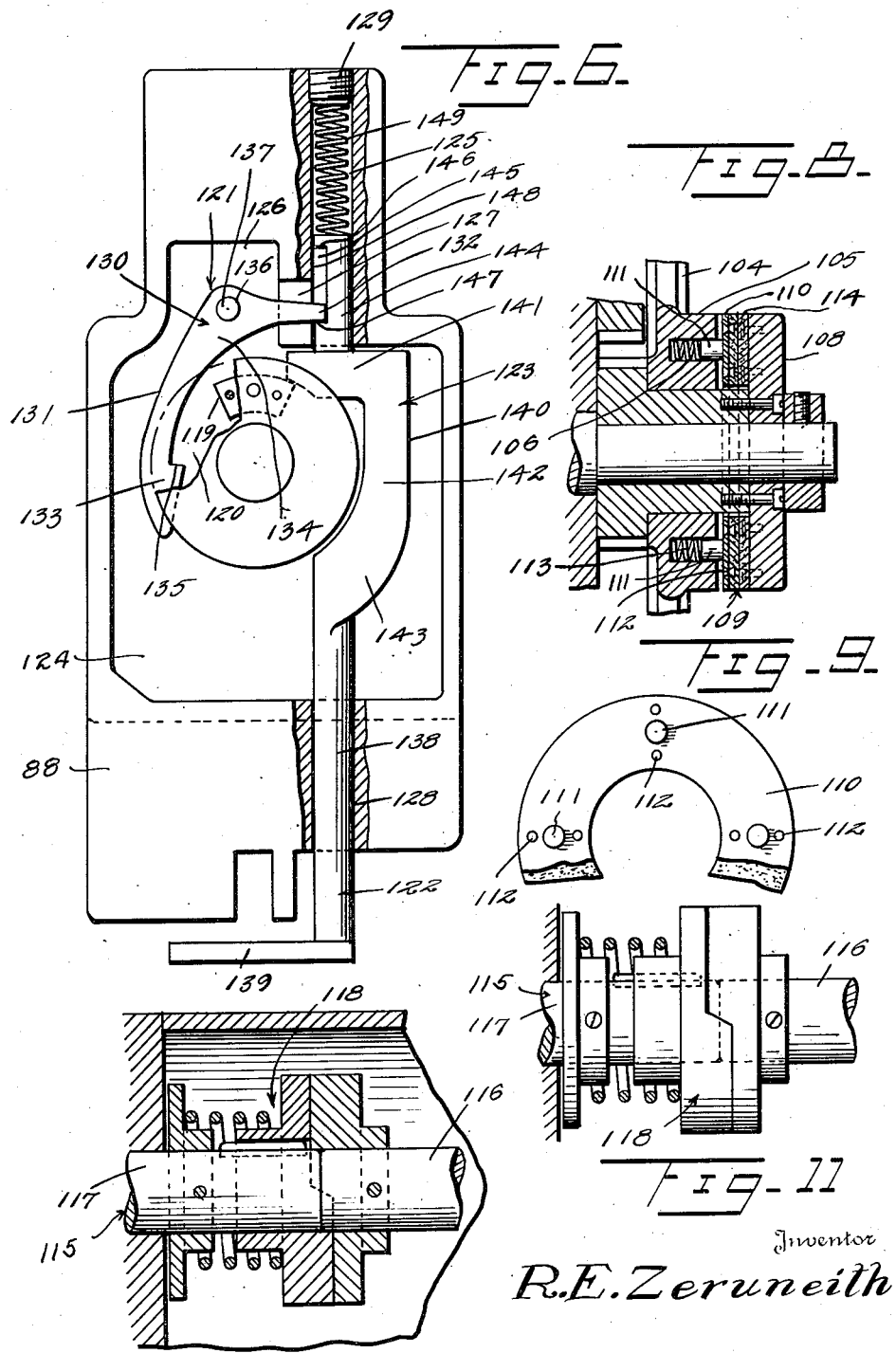

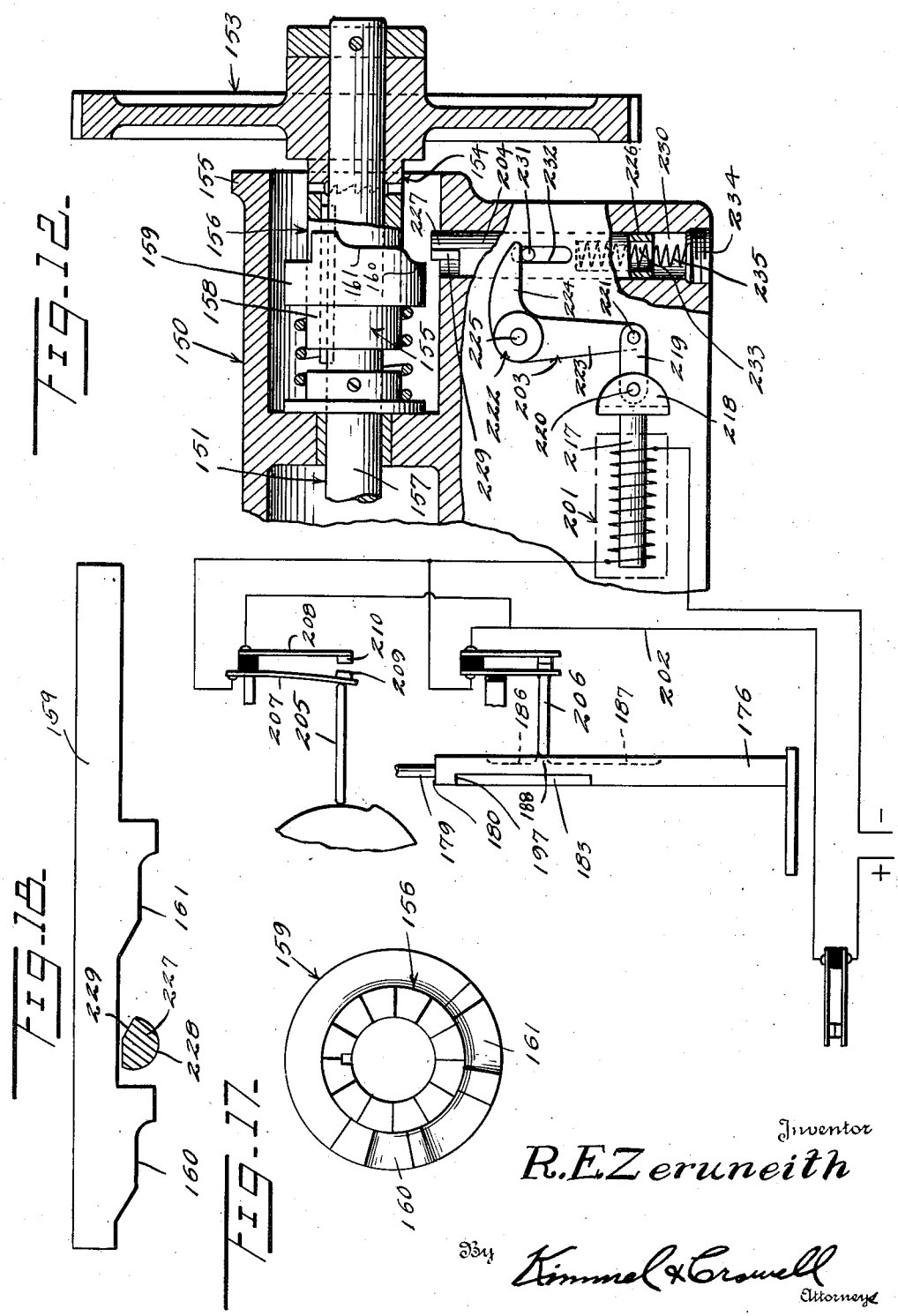

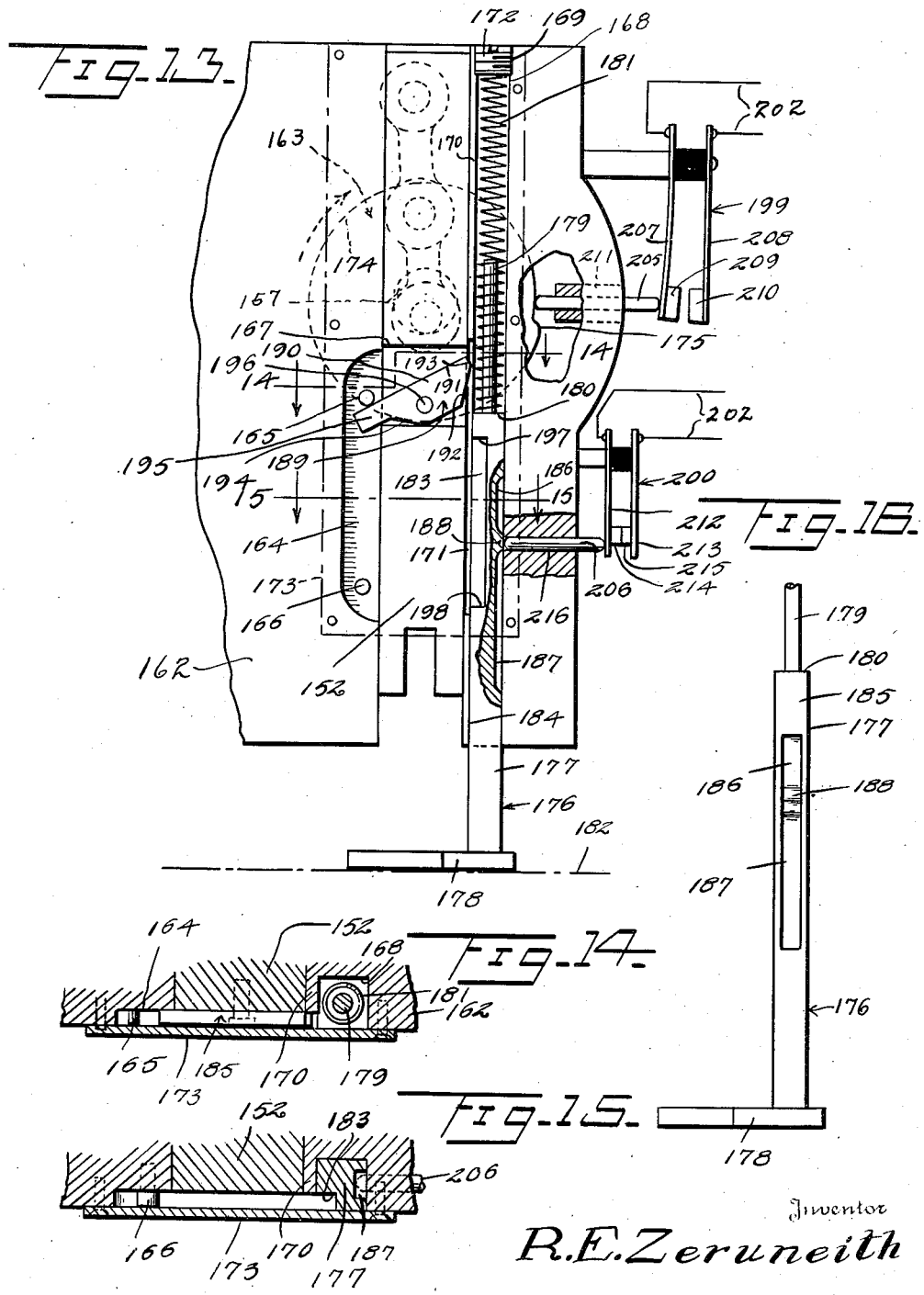

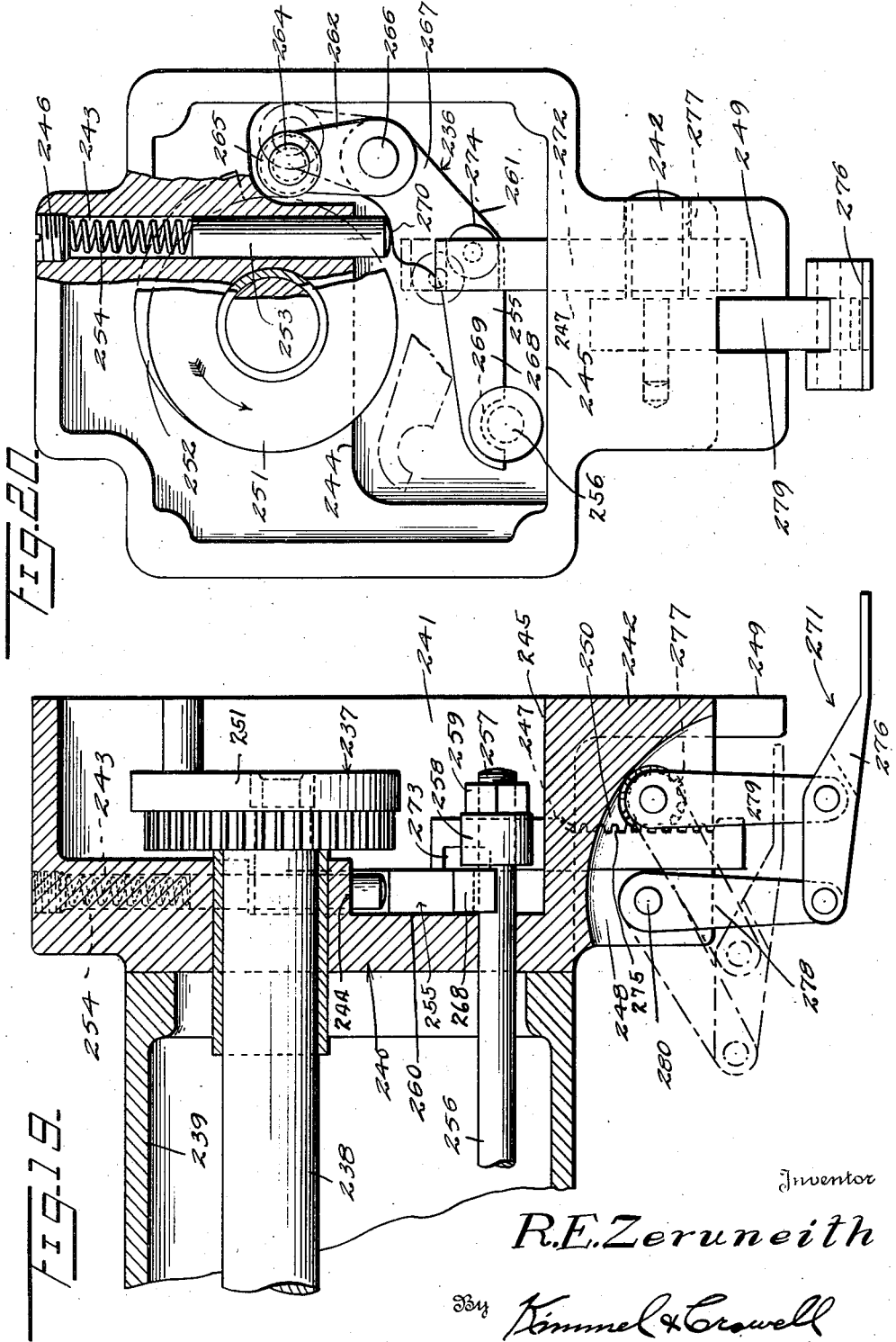

Patented Sept. 2, 1941

2,254,256

UNITED STATES PATENT OFFICE 2,254,256

SAFETY CONTROL

Rudolph E. Zeruneith, New York, N. Y.

Application August 14, 1939, Serial No. 290,091

8 Claims. (Cl. 192—137)

This invention relates to a safety control for use in connection with power driven machines, in general but more particularly for employment with wire stitching machines of that type for forming and driving wire staples.

The invention aims to provide, in a manner as hereinafter set forth, a safety control automatically discontinuing the operation of the machine when an element of the control meets with an obstruction disposed in the path of the operative stroke of a reciprocatory means of the machine and with such means being, by way of example a staple forming and driving element of the wire stitching machine.

The invention further aims to provide, in a manner as hereinafter set forth, a safety control so constructed and arranged to provide for the inactivity of a driving belt relative to a mechanism driven thereby when an element of the control meets with an obstruction disposed in the path of the operative stroke of a reciprocatory element of said mechanism whereby the operation of the latter is discontinued.

A further object of the invention is to provide, in a manner as hereinafter set forth, a safety control including means to cause the disconnecting of a driving structure from a driven structure when an element of control meets with an obstruction disposed in the operative stroke of a reciprocatory element of the driven structure thereby discontinuing the operation of the driven structure.

A further object of the invention is to provide, in a manner as hereinafter set forth, a safety control for stalling a driving motor for the driven structure when an element of the control meets with an obstruction disposed in the path of the operative stroke of a reciprocatory element of the driven structure whereby the operation of the driven structure is discontinued.

Further objects of the invention are to provide, in a manner as hereinafter set forth, a safety control for the purpose referred to which is comparatively simple in its construction and arrangement, strong, durable, readily installed with respect to the machine with which it is to be used, automatic in its action, thoroughly efficient in its use, readily assembled, and comparatively inexpensive to set up.

Embodying the objects aforesaid and others which may hereinafter appear, the invention consists of the novel construction, combination and arrangement of parts as will be more specifically referred to and shown in the accompanying drawings, wherein are illustrated embodiments of the invention, but it is to be understood that changes, variations and modifications may be resorted to which fall within the scope of the invention as claimed.

In the drawings:

Figure 1 is a fragmentary view in front elevation of a wire stitching machine of the staple forming and driving type showing the adaptation therewith, by way of example a safety control in accordance with this invention and with the control arranged in inactive position, Figure 2 is a fragmentary view partly in section and partly in front elevation showing the adaptation therewith of an explorer forming an element of the control and further illustrating in full and dotted lines respectively the starting and the lowest position of the explorer lifting member, Figure 3 is a fragmentary view in side elevation and vertical section of a machine showing the adaptation of the control with respect to the operating mechanism for the staple forming element of the machine, Figure 4 is a diagrammatic view of the power circuit related to an actuating solenoid forming an element of the control, Figure 5 is a fragmentary view in longitudinal section of a wire stitching machine showing the adaptation therewith of a modified form of safety control in accordance with this invention, Figure 6 is a front elevation of the control shown in Figure 5, and illustrating its arrangement in relation to the driven structure of the machine, Figure 7 is a vertical sectional view illustrating the driven structure of the machine in Figure 6 connected to the driving structure by a ball clutch, Figure 8 is a detail in vertical section illustrating a driving structure and driven structure of the machine shown in Figure 6 connected by a friction clutch, Figure 9 is a fragmentary view in rear elevation of an element of the structure shown in Figure 6, Figure 10 is a sectional detail illustrating the driving structure and driven structure of the machine shown in Figure 6 connected together by a single tooth clutch, Figure 11 is a side elevation of the structure shown in Figure 10, Figure 12 is a fragmentary view in longitudinal section of a machine including a driven structure and further showing the adaptation with said driven structure of still another modified form of safety control in accordance with this invention, Figure 13 is a front elevation of the modified form of control shown in Figure 12 arranged in relation with the stitching head of the wire stitching machine, Figure 14 is a section on line 14—14 Figure 13, Figure 15 is a section on line 15—15 Figure 13, Figure 16 is an elevation of an explorer forming an element of the control shown in Figure 15 and looking in a direction towards the outer side edge of the controller, Figure 17 is an elevation looking towards the cam surface of the slidably mounted clutch member forming element of the driven structure of the machine shown in Figure 12, Figure 18 is a top plan view of the development of the cam surface for the shiftable clutching member shown in Figure 12, Figure 19 is a fragmentary view in longitudinal section of a wire stitching machine showing the adaptation therewith of still another modified form safety control, in accordance with this invention and with the control shown in side elevation, and Figure 20 is a front elevation of the control shown in Figure 19 as applied to a wire stitching machine.

With reference to Figures 1 to 4 of the drawings, 1 generally indicates a wire stitching machine for forming and driving staples and 2 designates the staple forming element of the machine. The element 2 is reciprocated by an operating mechanism 3 carried by a driven shaft 4 carrying a driven pulley 5 operated from a transmission belt 6 travelling around a drive pulley 7 mounted on a drive shaft 8 operated from a motor 9 supported on the top of the machine.

The control as designated by Figures 1, 2 and 3 includes an explorer 10 formed of a shank 11 and a foot 12. The shank 11 is disposed at one side of the staple forming element and is also bodily carried upwardly by the latter on a portion of the upstroke of said element. The foot 12 is disposed in the operative path or downstroke of the element 2. The explorer is spring urged for the purpose of normally moving the foot 12 the desired distance below the lower end of the element 2, and which would be the work line. For the purpose of urging the explorer into the position as stated an urging spring 13 is employed. The spring 13 is mounted in a socket 14 formed in the body of the stitching head of the machine. The upper portion of the socket 14 is of less area than its lower portion and extending in said lower portion is the upper portion of the shank 11. The latter in its upper end is formed with a socket 15 for receiving the lower end of the spring 13. The explorer 10 acts to explore the operative path of the element 2, and when the foot 12 of the explorer 10 meets with an obstruction, the explorer 10 is arrested against the action of the spring 13, but when the obstruction is removed the spring 13 restores the foot 12 to its normal extended relation with respect to the lower end of the element 2. The outer side edge of the shank 11, intermediate the ends thereof is formed with a depression 16 for a purpose to be referred to. Integral with the body of the machine is a lug 17 formed with an axial passage 18 which opens into the depression 16. The depression 16 is in the form of a cam surface. The lug 17 is disposed at right angles to the shank 10. Slidably mounted in the passage 18 is a circuit closer 19, for a circuit to be referred to. The closer 19 is of greater length than the length of the lug 17. The outer side edge of the shank 11 is indicated at 20 and it operates on the closer 19 in a manner to be referred to.

The explorer 10 is bodily carried upwardly with the element 2 against the action of the spring 13, by what is termed an explorer lifting member or trip-carrier indicated at 21. The member 21 consists of a plate 22 having a horizontal top edge 23 and a pair of rounded lower corners 24. The width of the plate 22 corresponds to the width of the element 2. The upper terminal portions of the side edges of the plate 22 are formed with oppositely extending right angularly disposed protuberances 25, 26 of substantially triangular form having their horizontal edges flush with the edge 23. The plate 22 below its horizontal median and on its vertical median is pivotally connected to the outer face of element 2, as at 27.

The body portion 28 of the stitching unit or head of the machine has extending from the front thereof an upper and a lower outwardly directed stud 29, 30 respectively disposed in superposed aligned relation. The element 2 has its outer face formed with an outwardly directed stud 31 arranged above and to one side of the pivot 27.

With reference to Figure 2 the explorer 10 is shown with its foot 12 in full lines in extended relation with respect to the lower end of the element 2 and when in such position the stud 32, full line showing is arranged over and in the upward path of the protuberance 26. In Figure 2 the member 21 is shown in full lines at the start of its lifting stroke and when so arranged the protuberance 25 is seated on the stud 30. The full line showing of the member 21 is at the limit of the downstroke of the element 2. As element 2 moves upwardly it carries member 21 therewith and the protuberance 26 will engage the stud 32 and lift the explorer 10 against the action of the spring 13. When the member 21 is moved to the dotted line position shown in Figure 2 the protuberance 25 abuts stud 29 whereby member 21 will be canted or tilted to the dotted line showing (Figure 1) thereby releasing spring 13 which acting on the explorer 10 will shift the latter to dispose its foot 12 in extended relation with respect to the lower end of the element 2. The release of the explorer 10 from lifted position is had before the completion of the upstroke of the element 2. The operation just referred to will be had during the normal operation of the machine, that is to say when the explorer 10 has not met with an obstruction in the path of the operative stroke of the element 2. After the member 21 has been tilted or canted it will be caused to assume the full line position transversely of the element 2 due to the action of the stud 30 relative to the protuberance 25 on the element 2 carries the member 21 downwardly therewith. On the downward movement of member 21 the protuberance 26 clears stud 32.

The control includes a disc 33 having its edge provided with a cam 34. The disc 33 is fixed to and bodily revolves with the shaft 4. Loosely mounted on shaft 4 is a normally latched spring controlled combined belt releasing and brake applicator element 35 which is normally held (Figure 1) in a position to tighten the belt 6 so the latter will perform its driving function and also acts to hold a braking means, to be referred to in inactive position. The element 35 is shiftable in opposite directions and when shifted in one drection and latched it acts to tighten the belt 6 whereby the latter will perform its driving function and also makes inactive the braking means, but when released and shifted in the other direction by its controlling spring it releases the belt from its driving function and shifts the braking means to active position. The element 35 comprises a pair of oppositely extending arms 36, 37 disposed in angular relation and merging at their inner ends into each other is a laterally disposed arm 38. The arms 36, 37 and 38 are termed respectively upper, lower and intermediate arms. The arm 38 merges at its inner end into the inner ends of and is disposed substantially at right angles to the arms 36, 37.

The upper end of the arm 36 is formed with a forwardly directed right angularly disposed extension 39 carrying a shaft 40, the latter projects forwardly from the extension 39 and is provided thereon with a revoluble belt tightening and releasing roller 41. The shaft 40 also extends through the upper end of the arm 36 and it is formed in a manner to not only connect it to arm 36 but also to connect the roller 41 thereon. The roller 41 is disposed at the forward end of the extension 39. The roller 41 is to bear against a stretch of the belt 6, as shown in Figure 1 for the purpose of tightening the belt to have the latter perform its driving function. The roller 41, with the element 35 is shifted in one direction of its movement by its controlling spring, is moved clear of the belt 6 and under such conditions the belt 6 will not perform its driving function. The manner in which the roller 41 is shifted from off of the belt 6 will be referred to. The arm 36 of element 35 extends above the driven pulley 5. The arm 37 of element 35 depends below the driven pulley 5. The disc 33 is arranged on the shaft 4 between the driven pulley 5 and the element 36. Connected to the body of the machine is a stud 42 to which is attached the controlling spring 43 for the element 35. The spring 43 is connected to the lower end of the arm 37 of the element 35 and normally tends to move the roller 41 from belt tightening position, such as shown in Figure 1.

The braking means referred to is indicated at 44 and it is so related to the pulley 5 for applying a braking action thereon when the belt 6 has been made inactive on the moving of the roller 41 clear of the belt. The braking means 44 includes an upstanding normally outwardly inclined lever arm 45 pivotally mounted at its lower end, as at 46 and having its upper end, as at 47 pivotally connected to an end of a pull bar 48. The latter at its other end is pivotally connected, as at 49 to the arm 36 of element 35. The lever 45 intermediate its ends is provided with a brake shoe 50 for application to the pulley 5 when the element 35 is shifted in a direction to release the drive of the belt.

Under normal operating conditions of the machine the element 35 and the braking means 34 will appear as shown in Figure 1, but when an obstacle is discovered in the operative path of element 2 by the explorer 10, the control is provided with means associated with element 35 which will automatically provide for releasing the belt in a manner relative to the pulley 5 to arrest the driving thereof and further to cause element 35 to apply the braking means 44 to such pulley. The parts of the control which are associated with explorer 10 and element 35 to provide for making the belt inactive relative to pulley 5 and to apply the braking means will now be referred to.

Removably seated on the outer end of the arm 38 of the element 35 is the upper end of a shiftable latching lever 51 for the element 35. When lever 51 is released the controlling spring 43 shifts the element 35 in a direction to move the roller 41 clear of the belt 6 and the bar 48 in a direction to move lever 45 in a manner to apply the brake shoe 50 to the pulley 5, under such conditions arresting the operation of the driven structure of a machine. The lever 51 is upstanding and pivotally mounted intermediate its ends, as at 52. The lever 51 is shifted in a direction to release the element 35 by a solenoid 53 having its core indicated at 54. The latter is provided with a head 55. The lower end of the lever 51 is connected with the head 55 by a link 56, which is pivotally connected, as at 57 to lever 51 and at 58 to the head 55. A controlling spring for lever 51 is indicated at 59 and it is connected to the body of the machine and to the lower end of lever 51. The solenoid 53 is normally deenergized.

Secured to the body of the machine in proximity to the disc 33 is a normally open contact device 60 interposed in a solenoid circuit 61. The device 60 consists of a pair of resilient suspensions 62, 63 for a pair of contacts 64, 65. The device 60 is intermittently closed. The suspension 62 carries a circuit closer 66 engageable by the cam 34 to provide for the abutting of the contacts 64, 65 to close device 60. Arranged adjacent to the lug 17 is a normally closed contact device 67 and which is closed by means of the circuit closer 19 engaging with the edge 20 of shank 11. The device 67 consists of a pair of resilient suspensions 68, 69 carrying contacts 70, 71. The normal position of the contact device 67 is as shown in Figure 1 and this statement applies to the closer 19 when the machine is operating under normal conditions. The closer 19 when the machine is in normal operating condition is forced by the suspension 68 into the cavity or cam 16 formed in the shank 11 of the explorer 10. When the latter meets with an obstruction its downward movement is arrested against the action of its controlling spring whereby the closer 19 is held outwardly by the edge 20 of shank 11 to maintain contact 70 in engagement with the contact 71 whereby, when contacts 64, 65 are engaged due to the action of cam 35 the solenoid circuit 61 will be closed, the solenoid energized and its core 54 will act to shift the lever 51 in a direction to release the element 35 and the latter will act in a manner to move the roller 41 from engagement with the belt 6 and apply the braking means which results in the inactivity of the driven structure of the machine.

With reference to the modified form of safety control shown by Figures 5 to 11, the driving and driven structures of the machine with which such form of control is installed with are generally indicated at 70, 71 respectively. With reference to Figure 5, the driving structure 70, as shown, includes an electric motor 72, a peripherally grooved driving pulley 73 on the motor shaft 74, a peripherally grooved driven pulley 75 having a hub 76 extending rearwardly therefrom and a driving belt 77 leading from the pulley 73 to pulley 75. With reference to Figure 5, the driven structure 71, as shown, includes an operating shaft 78 formed of forward rear portions of different diameters, the forward portion is of largest diameter and indicated at 79 and the rear portion is of smallest diameter and indicated at 80. The junction of the shaft portions 79, 80 provides the shaft 78 with a peripheral shoulder 81. The shaft portion 79 has secured to its forward end a means, indicated at 82 for operating reciprocatory parts, not shown, of the driven structure. These parts by way of example will be the staple forming and driving elements of a wire stitching machine. Secured upon shaft portion 79 is a collar 83 formed at its rear end with an annular peripheral flange 84 which is flush with the shoulder 81. Secured upon the shaft portion 80 is a bearing sleeve 85 which at its forward end abuts the shoulder 81 and the collar 83. The forward end of sleeve 85 is formed with an annular peripheral toothed flange 86 of materially less diameter than and abutting the inner part of flange 84. The shaft 78 is mounted in the body part 87 of the stitching head of the machine. The part 87 has its front portion 88 of greater height than its rear portion 89. The portion 88 is disposed to extend above and to depend below the portion 89. The shaft 78 extends rearwardly from body portion 89.

The hub 76 of pulley 75 is mounted on sleeve 85 and abuts the rear face of flange 86. The flange 84 has pivoted thereto the ordinary spring controlled clutching pawl 90 of known form for engagement in the teeth of the flange 86 for releasably clutching the driving structure to the driven structure.

With reference to Figure 5 there is mounted on shaft portion 80 and abutting the rear end of sleeve 85 a disc 91 formed with an axial opening 92. The disc 91 is secured to the rear end of sleeve 85 by the countersunk holdfast means 93 whereby the disc 91, sleeve 85 and shaft 78 will bodily rotate together. A retaining means 94 for the disc 91 abuts the latter and is secured to shaft portion 86. The body of disc 91 in proximity to its outer edge is formed with a socket 95 which registers with the mouth of a socket 96 formed in the hub 76. Positioned in the sockets 95, 96 is a pin 97 for coupling the pulley 5 with the disc 91 whereby on the operation of pulley 75 the driven structure 71 will be operated from the driving structure 70 as long as the pin 97 is in its coupling position or until the pin is sheared.

With reference to Figure 7 the drive pulley of the structure 70 which corresponds to the pulley 75 shown by Figure 5 is indicated at 98 and its hub at 99. The pulley 98 and its hub 99 is set up relative to the sleeve 85 in the same manner as the pulley 75 and the hub 76 of the latter. The disc (Figure 7) which corresponds to the disc 91 (Figure 5) is indicated at 100 is not formed with a socket, such as the socket 95 in disc 91, but in lieu thereof it is provided on its inner face with a semi-spherical cavity 101 to receive the ball of a spring controlled ball clutch structure 102 mounted in a socket 103 formed in the hub 99 of pulley 98. The ball clutch structure, when active in connection with the cavity 101 provides for the operation of the driven structure from the driving structure as long as clutch 102 is active. The hub 99 is not provided with the socket 96. The ball clutch structure functions for the same purpose as the pin 97.

With reference to Figures 8 and 9, the drive pulley and its hub of the driving structure are indicated at 104, 105 respectively. The hub 105 is formed with a plurality of rearwardly opening sockets 106. The hub 105 is of a length less than sleeve 85. The disc (Figure 8) which corresponds to disc 91 or 100 is indicated at 108. Positioned between the hub 105 and disc 108, as well as encompassing a part of sleeve 85 is a frictional clutch structure 109 of the disc type including an annulus 110 positioned against the hub 105. The annulus 110 carries studs 111 and pins 112. The studs 111 extend into the sockets 106 and bear against springs 113. The pins 111 engage in the disc-like parts 114 of the structure 109. The latter provides for coupling the driven structure to the driving structure. The disc 108 is not formed with a socket or a cavity.

Otherwise than as stated with respect to Figures 7, 8 and 9 the driving and driven structures will be the same as that shown by Figure 5.

With reference to Figures 10 and 11 the operating shaft of the driven structure is indicated at 115 and it is of the break type formed of a front and rear section 116, 117 respectively. The section 116 is what may be termed a driver for the section 117. The section 116 is to be connected to a prime mover not shown. There is associated with the shaft sections 116, 117 a single tooth spring clutch 118 to provide for the operating of section 117 from section 116.

The modified form of safety control shown by Figures 5 and 6 includes a segmental shaped abutment 119 secured to the rear face of a revoluble disc 120 forming an element of the means 82, a pivoted normally latched combined impact receiving and arresting element 121 for coaction with the abutment 119, an explorer 122 and a spring urged carrier 123 for the explorer 122 and which also acts as a latch for the element 121.

The front portion 88 of the body part of the stitching head is formed with an open front chamber 124, an upper vertically disposed guide opening 125 communicating at its lower end in the upper portion of chamber 124, a recess 126 in the top wall of chamber 124, a groove 127 in the said top wall opening into the recess 126, the chamber 124 and the lower end of guide opening 125, and a lower vertically disposed guide opening 128 communicating at its upper end with the chamber 124. The guide openings 125, 128 are arranged in inner endwise aligned position. The wall of opening 125 at its upper portion is threaded and engaging with such portion is a threaded closure 129 for closing the upper end of such opening and which also acts as an abutment.

The element 121 comprises a pivotally suspended one-piece body 130 formed of a depending incurved arm 131 and a horizontally disposed arm 132 which is integral with the upper end of arm 131 and extends laterally from the latter. The arm 131 is of greater length than arm 132 and it is formed with a substantially quadrangular shaped lower portion 133 and a flared upper portion 134 of greater length than portion 132. The lower end of portion 134 is of less width than the upper end of portion 133 and it is spaced from the inner side edge of portion 133 to thereby provide the upper end of the latter with a part 135 offset with respect to said portion 134. The part 135 may be termed a nose adapted to be shifted into the part of and capable of being impacted upon by the abutment 119. The said portion 134 constitutes a combined stop and arrester. The upper portion of the arm 131 extends into the recess 126 and it is apertured, as at 136 for mounting on a pivot 137. The arm 132 is tapered and is disposed in the recess 126 and extends through groove 127 into the guide opening 125. The element 121 is arranged rearwardly of the disc 120 and is so positioned, that when released it will dispose the offset part 125 in the path of the abutment 119 to be impacted upon.

The explorer 122 includes a vertical shank 138 arranged within the lower portion of chamber 124 and extending downwardly through the opening 128. The lower end of the shank 138 merges into a foot 139 disposed in the operative path of a reciprocatory element of the driven structure. The foot 139 is disposed at right angles to the shank 138.

The carrier 123 includes a body part 140 formed of a horizontally disposed upper portion 141, a vertically disposed intermediate portion 142 integral with and depending from the outer end of portion 141 and a depending incurved lower portion 143 merging at its upper end into the lower end of portion 142 and at its lower end into one side of the upper end of shank 138. The portion 141 extends inwardly beyond the lower end of the portion 143. Formed integral with the top of the portion 141 is the lower end of a vertically disposed head-piece 144 extended into the lower portion of the opening 125 and formed lengthwise thereof with a peripheral cut-out 145 having an upper wall 146, a lower wall 147 and a pair of side walls 148. The outer or free end of the arm 132 of element 121 is arranged in the cut-out 145. The head-piece 144 is arranged in alignment with the shank 138 of the explorer 139. The carrier 123 is spring urged and for such purpose a coiled spring 149 is arranged in the opening 125 between the head-piece 144 and the closure 129. The action of the spring 149 is to normally position the foot 139 in extended relation with respect to the lower end of the reciprocating element of the driven structure. The lowered position of the carrier 123 provided by the spring 149 will cause the upper wall 146 to engage the arm 132 and latch element 123. The latched position of element 123 will be such that the off-set part 135 of such element will be clear of the abutment 119 whereby the operation of the machine will not be impaired.

It will be assumed that the foot 139 of the explorer 122 meets with an obstruction in the operative path of the reciprocatory element of the driven structure then explorer 122 cannot be urged by the spring 125 to an extent to latch element 121. Under such conditions the arm 131 of such element will not move outwardly to an extent to position the offset part 135 clear of the path of the abutment 119 and as the disc 120 is revolving it will cause the abutment 119 to impact the offset part 135 whereby the latter will arrest the operation of the shaft of the driven structure resulting in the stalling of the motor or the impairing of the clutching connections, between the driving and driven structures to an extent to stop the operation of the machine.

The modified form of safety control Figures 12 to 17 is shown by way of example in connection with a wire stitching machine 150 of the staple forming and driving type. The machine 150 includes a driven structure 151 including as a part thereof a reciprocatory means 152 such as a staple forming element. The structure 151 is operated from a driving structure or prime mover 153 which is adapted to be clutched to the structure 151 by a clutch structure 154 formed of a clutch member 155 fixed to the driving structure and a spring controlled clutch member 156 slidably mounted on the operating shaft 157 of the structure 151. The member 156 is to normally engage with the member 154 whereby the shaft 157 is driven from the structure 153. The member 156 as shown includes a sleeve 158 provided with teeth for clutching the teeth of member 154. Encompassing and fixed to the sleeve 158 intermediate its ends is an annular cam element 159 formed on one of its edges with a pair of cam surfaces 160, 161. The surface 160 is adapted to be engaged by a shifter of any suitable form and arrangement, not shown which coacts with the surface 160 for moving sleeve 158 in a direction to unclutch the driven structure from the driving structure when desired. The cam surface 161 forms a part of the second modified form of control and it is to coact with a normally latched element, to be referred to of the control for the purpose of unclutching the driven structure from the driving structure when an obstacle is interposed in the operative path of the reciprocatory means of the driven structure. The development of the cam element 159 is shown by Figure 18.

With reference to Figures 13, 14 and 15 the body of the stitching head of the machine is indicated at 162 and it has slidably mounted therein means 152 which will be termed a staple forming element and which is reciprocated in a known manner such, by way of example by the operating means 163. It is well known that the means 163 also operates the staple driving element of the machine. Means 163 is operated by the shaft 157. The body 162 is formed in its front and at one side of the passage in which element 152 reciprocates with a cut-out 164 of less length than said body and which borders such passage. Arranged in the cut-out 164 is an upper and a lower stud 165, 166 respectively arranged in superposed spaced alignment. The stud 165 is positioned near the upper end of the cut-out 164 and the stud 166 is positioned in proximity to the lower end of the cut-out 164. The element 152 intermediate its ends and in its front face is provided with a wide transversely extending groove 167 opening at the side edges of said element 152. The body 162 is formed in its front with a vertically disposed channel 168 having the major portion of its length of square cross section and the remaining portion of its length substantially of circular cross section. The said remaining portion of the length of the channel 168 is at the upper end of the latter and is indicated at 169 and threaded. The channel 168 opens at the upper and lower ends of the body 162. Interposed between channel 168 and the element 152 is what may be termed a partition 170 corresponding in length to the body 162. The partition 170 at its front is cut-out, as at 171 to form what may be termed a groove for establishing communication between the passage in which element 152 reciprocates in the channel 168. The purpose of the cut-out or groove 171 will be presently referred to. The upper end of the channel 168 is closed by an inverted plug 172 which also constitutes an abutment. Secured to the front of the body 162 is a front plate 173 which closes the major portion of the passage in which travels the element 172, as well as extending across the cut-out 164 and the major portion of the length of the channel 168. The means 163 which reciprocates the staple forming and driving elements includes a disc 174 having its edge provided with a cam surface 175.

Arranged in the channel 168 and extending from the bottom of the body 162 is a spring urged explorer 176 formed of a shank 177 and a foot 178 at the lower end of and disposed at right angles to the shank 177. The foot 178 is disposed in the operative path of the element 152. The shank 167 is arranged in the channel 168 and has its upper end provided with an extension 179 of circular cross section. The shank 177 is of square contour. The extension 179 is disposed centrally of the upper end of the shank 177. At the point of mergence of the lower end of the extension 179 with the upper end of the shank 177 a peripheral shoulder 180 is provided, due to the difference in the diameter of the extension 179 with respect to the width and the breadth of the upper end of the shank 177. Surrounding the extension 179 and interposed between the shoulder 180 and the plug 172 is a coil spring 181 positioned in the channel 168 and permanently tending to urge the explorer 176 in extended relation with respect to the lower end of the element 152. The normal position of the foot 178, due to the action of the spring 181 is at the work line 182. The front of shank 177 between its transverse median and its upper end is provided with a cut-out 183, which opens at the side edge 184 of the shank 177. The purpose of the cut-out 183 will be hereinafter referred to. The other side edge 185 of the shank 177 is formed with an upper and a lower pocket 186, 187 disposed in superposed relation and separated by a tapered partition 188 which has its outer end flush with the edge 185. The pocket 186 is of less length than and arranged above the pocket 187. The pocket 186 is arranged adjacent the cut-out 183. The pocket 187 has a portion of its length arranged adjacent the cut-out 183 and the remaining portion of its length depending below such cut-out. The purpose of the pockets 186, 187, as well as the partition 188 will be referred to.

Arranged in the groove 167 of the element 152 is a lifting member 189 for the explorer 176. The member 189 consists of a plate 190 having a straight top edge 191, an outwardly inclined side edge portion 192 which merges into the remaining portion of such edge and such remaining portion is straight and indicated at 193. The plate has its other side edge 194 which inclines outwardly throughout. The edge portion 192 and the edge 194 are oppositely outwardly inclined. Formed integral with the plate 190 above the edge 194 is an outwardly directed rectangular arm 195. The plate 190 between its vertical median and the arm 195 is mounted on a pivot 196 carried by the element 152. The arm 195 is arranged between the studs 165 and 166. The member 189 is bodily carried with the element 152 and it is adapted to extend through the cut-out 171 and engage in the cut-out 183. The cut-out 183 includes an upper and a lower wall 197, 198 respectively. The normal position of the member 189 with respect to the explorer 186 is as shown in Figure 13. When element 152 moves downwardly it carries the member 189 therewith and as the latter moves downward it will ride one side against the shank 177 and clear the upper portion of such shank and extend into the cut-out 183. When member 189 extends into the cut-out 183 it will be disposed horizontally. It will be assumed that the machine is operating under normal conditions and that the parts are as shown in Figure 13 and when in such position the explorer 176 is disposed in extended relation with respect to the element 152. As the element 152 moves downwardly the member 189 is carried therewith and will assume the position heretofore referred to. It will now be assumed that element 152 has completed its operative stroke and starts to move in an upward direction. As element 152 continues to move upwardly the member 189 will engage the wall 197 thereby lifting the explorer 176 against the action of the spring 181. On a continued upward movement of the element 152 with the explorer moving in the same direction against the action of the spring 181, the wall 197 will provide of the member 189 tilting or canting to the position shown in Figure 13 whereby the explorer 176 will be released and the spring 181 will then act to shift the explorer 176 in a direction towards the work line 182.

The second modified form of the safety control is so constructed that when the explorer 176 is shifted by the spring 181 towards the work line that if the explorer 176 meets with an obstruction disposed in the operative path of the element 152 the operation of the driven structure, which element 152 forms a part of will be automatically discontinued. The means which performs the function just stated is associated with the explorer 176 and the cam surface 175 of the disc 174 and such means includes an upper normally opened contact device 199, a lower normally closed contact 200, a solenoid 201, a solenoid circuit 202, a latching structure 203, a spring controlled shifting structure 204 for the clutch member 156, a circuit closer 205 and a circuit closer 206. The contact device 199 is interposed in the solenoid circuit 202. The contact device 200 is interposed in the solenoid circuit 202. The device 199 includes a pair of depending resilient suspensions 207, 208 provided with contacts 209, 210 respectively. The circuit closer 205 is associated with the contact device 199 and it is slidably mounted in the support 211 on the body of the machine. The closer 205 is associated with the disc 174 and the cam surface 175 on disc 174 acts to shift the closer 205 to engage the suspension 207 for the purpose of moving contact 209 into engagement with contact 210. The contact device 200 includes a pair of depending resilient extensions 212, 213 provided with contacts 214, 215 respectively. The circuit closer 206 coacts with the device 202. The closer 206 is slidably mounted in the groove 216 formed in the body of the machine and it is associated with the partition 188 whereby when it is engaged by such partition it will act on the suspension 212 to provide for the engagement of the contacts 214, 215 as shown in Figures 12 and 13.

The solenoid 201 is normally energized and its core is indicated at 217. The core 217 is provided with a head 218 connected with the latching structure 203. The connection between the core 217 and the latching structure 203 consists of a link 219, pivotally connected as at 220 to the head 218 and as at 221 to the latching structure 203. The latter consists of an upstanding bell crank lever 222 formed of a depending arm 223 and a horizontally disposed arm 224. The latter extends laterally from the upper end of the arm 223. At the point of mergence between the arms 223, 224 the lever 222 is mounted on a pivot 225.

The spring controlled shifting structure 204 consists of a vertically disposed plunger 226 formed at its upper end with a nose 227 having a rounded surface 228 and an oppositely inclined surface 229 for engaging with the cam surface 161. The plunger 226 is slidably mounted in a vertically disposed channel 230 formed in the machine body (Figure 12) and it is provided with a laterally extending pin 231 which extends through a slot 232 formed in the machine body (Figure 12). The slot 232 opens to the channel 230. The pin 231 constitutes what may be termed a keeper. The plunger 226 is formed with a socket 233 which opens at its lower end. The channel 230 at its lower end is closed by a removable plug 234 which constitutes an abutment. Interposed between the plug 234 and extending into the socket 233 is the controlling spring 235 for the plunger 226. The function of the spring 235 is to project the plunger 226 in a direction to coact with the cam surface 161 on element 159 for the purpose of the nose 227 to coact with the cam surface 161 to shift the clutching member 156 from clutching engagement with the member 155 to thereby discontinue the operation of the driven structure 151. The solenoid 201 when energized retains the latching structure 203 in engagement with the pin 231 to thereby releasably retain the plunger 226 in its retracted position, such as shown in Figure 12. When solenoid 201 is de-energized, which action will take place when the explorer meets with an obstruction in the operative path of element 152, the latching structure 203 will be in released position and the action of the spring 235 will project the plunger 226 to act on the cam surface 161 and move the member 156 from clutching engagement with the member 155.

The operation of the control is so timed that when the explorer 176 meets with an obstruction the contact device 199, as well as the contact device 200 will be opened under such conditions opening the solenoid circuit 202 resulting in the de-energizing of the solenoid and permitting of the activity of the spring 235. When the explorer 176 meets with an obstruction the circuit closer 206 will be shifted by the suspension 212 into the pocket 187 and at this time as the closer 205 is traveling on what may be termed the low part of the edge of the disc 174, due to the action of the suspension 207, both contact devices will be open resulting in the opening of the solenoid circuit.

The second modified form of the shifter control also provides for the explorer acting to automatically discontinue the operation of the driven structure from the driving structure when the explorer is shifted to beyond the work line, that is to say when there is no work on the work table to be operated upon by the element 152. When the explorer 176 is shifted below the work line, by the spring 181 the closer 206 will be shifted by the suspension 212 into the pocket 136 and at this time as the explorer 205 is traveling on the low part of the edge of the disc 174 and held in such position by the suspension 207 both contact devices will be open resulting in the opening of the solenoid circuit whereby the solenoid will be de-energized and the spring 235 will perform its function to position the plunger 226 to engage the cam surface 161 and shift the clutching member 156 from clutching engagement with the member 155 resulting in the discontinuing of the operation of the driven structure.

The modified form of safety control 236 shown by Figures 19 and 20 is designed primarily for use in connection with the spring controlled plunger 584, Figure 12, of my copending application, Serial No. 267,739, filed April 13, 1934. The said plunger 584 forms an element of a wire stitching machine and is normally latched. The plunger 584 is for correlation with the spring controlled clutching pawl 564 shown in the aforesaid application. The pawl 564 acts to clutch a driving means to a driven means to operate the latter. The plunger 584, when released impacts the pawl 564 and acts to hold it clear of the driven means to prevent operation of the latter from the driving means. The pawl 564 is carried by the driven means, at one end thereof and is to coact with a ratchet at that end of the driving means which opposes the said end of the driven means. The driving means, ratchet and the pawl referred to are not shown by Figures 19 and 20. Although the safety control 236 disclosed by Figures 19 and 20 is designed primarily for use in connection with the plunger 584, it is to be understood that such control is for employment in any connection for which it may be found applicable.

The safety control 236 is shown in connection with a wire stitching machine of that type including a staple forming and a staple driving element. The said elements are not shown, but they are operated from an actuating means 237 carried by the driven means or structure 238 of the machine. A portion of the body of the wire stitching machine is indicated at 239 and it includes a casting 240 formed with an open front chamber 241 and a depending hollow part 242. The operating means 237 referred to is arranged within the chamber 241 and it is at the forward end of the driven structure 238 which has a portion thereof journalled in the back of the casting 240. A vertically disposed passage 243 is formed in the back of the casting 240 and it opens at its lower end through a transversely disposed wall portion 244 arranged in parallel spaced relation to the bottom wall 245 of chamber 241. The passage 243 is closed at its upper end by a removable threaded plug 246. The casting 240 is formed with a vertically disposed opening 247 communicating at its upper end with the chamber 241 and opening at its lower end into a chamber 248. The opening 247 constitutes a guide passage for a purpose to be referred to. The chamber 248 is closed at its front, open at its bottom and also open at its rear. The portion 242 at its front has a depending part 249 which is cut to form a clearance. The portion 242 is also cut out as at 250 to establish communication between the chamber 248 and the opening 247.

The operating means 237 includes a disc 251 having its edge formed with a cam surface 252 which is of less length than the circumference of disc 251. Arranged within the passage 243 is a vertically disposed spring controlled plunger 253. The controlling spring for plunger 253 is indicated at 254 and it is arranged within the passage 243 between the upper end of the plunger 253 and the inner end of the plunger 246. The spring controlled plunger 253 constitutes a pushing means for a purpose to be referred to.

Arranged within the chamber 241 is a latching lever 255 which is associated with a spring controlled plunger 256. The latter corresponds to the plunger 584 disclosed by my copending application aforesaid. The plunger 256 extends through the body 239 of machine and also through the casting 240 into the chamber 241. The plunger 256 has that end terminal portion thereof arranged in the chamber 241 and indicated at 257 threaded. Threadably engaging with the end portion 257 of the plunger 256 is an annular abutment 258 which is retained on the plunger 256 by a holding nut 259. The plunger 256 is normally latched in retracted position and when in such position the abutment 258 will be arranged as shown in Figure 19 and which is in spaced relation to the wall portion 260 of the chamber 241.

The lever 255 is substantially of the bell crank type and includes an arm 261 which is disposed substantially horizontally and an upstanding arm 262. The latter is of less length than the arm 261. The arm 262 carries a stub shaft 264 at its upper end provided with a roller 265 arranged in the path of the cam surface 252. At the point of mergence of the arm 261 with the arm 262 the lever 255 is mounted on a pivot 266 extended from the wall forming portion 260 of the chamber 241. The arm 261 of lever 255 includes an inner inclined part 267 and an outer inclined part 268. The part 268 extends downward in connection from the lower end of the part 267. The part 268 at its outer end is formed with an arcuate groove 269 which opens at its lower edge and such groove is arranged, when the plunger 256 is in the position as shown in Figure 19, directly over the plunger between the wall forming portion 260 and the abutment 258. The lever 255 normally is in the position shown in Figure 20 for the purpose of latching the plunger 256 in its contracted position. The part 261 of the lever 255 is arranged directly below the lower end of the plunger 253 and the latter bears on the edge part 270 of the lever 255 for normally forcing the arm 261 downwardly and acts to hold the lever 255 in overlapping relation with respect to the plunger 256 until the downward movement of the lever arm 261 is arrested. The cam surface 252 acts on the roller 265 to rock lever 255 in a direction to elevate the arm 261 against the action of the spring control plunger 252 but complete removal of lever 261 from latching position relative to plunger 256 is not had unless a foreign object is interposed in the path of the explorer 271 to be more fully referred to.

Travelling in the opening 247 is a vertically movable plunger 272 formed with a groove 273 on one side of its upper end. Slidably arranged in groove 273 is a roller 274 carried by the part 268 of the lever arm 261 whereby plunger 272 is slidably connected to and is bodily carried by the lever arm 261. The plunger 272 is provided with teeth 275 for a purpose to be referred to. The plunger 272 is moved downwardly by the lever arm 261 and when the explorer 271 meets with an obstruction the plunger 272 will be held in the dotted line position shown in Figure 20, thereby arresting the lowering of lever arm 261, see dotted line position of lever, Figure 20 whereby the lever 255 will be held clear of the plunger 256 and release the latter so it will act on the clutching pawl to disconnect the driving means from the driven means and discontinue the operation of the machine.

The explorer 271 includes a shoe 276 which is to be disposed in the operated path of the staple forming element of the wire stitching machine. The teeth of the plunger 272 engage a gear 277 rotatably mounted in the portion 242 of the casting 240. The gear 277 acts as one of the pivots of a pantograph of which the shoe 276 forms the connecting link between the two swinging arms 278, 279. The other pivot of the pantograph is indicated at 280. If the shoe 276 meets an interference during its downswing, in the operated path of the staple forming element it will provide for the parts correlated therewith to act on the lever 255 to prevent it from latching to the plunger 256 whereby the latter will be released and will perform, when in its projected position, the function to provide for the clutching lever being moved to a position disconnecting the driving means from the driven means.

What I claim is:

1. In a safety control for the purpose set forth a normally spring urged oppositely movable explorer adapted for disposing in the operative path of an oppositely movable driven element, and a trip-carrier adapted to be pivotally mounted on and bodily carried with said element for moving said explorer in one direction a predetermined extent against the action of its urging spring, said carrier having a laterally extending protuberance at its top, said explorer having a stud correlating with said protuberance to provide for such movement of the explorer by the carrier.

2. In a safety control for the purpose set forth a normally spring urged oppositely movable explorer adapted for disposing in the operative path of an oppositely movable driven element, a trip-carrier adapted to be bodily carried with said element for moving said explorer in one direction a predetermined extent against the action of its urging spring, said carrier and explorer having correlated parts to provide for such movement of the explorer by the carrier, a driving means for said oppositely movable element, controllable means for said driving means, and said driving means and said explorer having means correlated with said controllable means made active, when said explorer meets with an obstruction in said path for discontinuing the operation of said driving means.

3. In a safety control for the purpose set forth a normally spring urged oppositely movable explorer adapted for disposing in the operative path of an oppositely movable driven element, a trip-carrier adapted to be bodily carried with said element for moving said explorer in one direction a predetermined extent against the action of its urging spring, said carrier having a laterally extending protuberance at its top, said explorer having a stud correlating with said protuberance to provide for such movement of the explorer by the carrier, said carrier having another laterally extending protuberance at its top, means located adjacent to said element and coacting with the said another protuberance for shifting the carrier clear of said stud to release the explorer, and means for pivotally connecting said trip-carrier to said member.

4. In a safety control for the purpose set forth a normally spring urged oppositely movable explorer adapted for disposing in the operative path of an oppositely movable driven element, a trip-carrier adapted to be bodily carried with said element for moving said explorer in one direction a predetermined extent against the action of its urging spring, said carrier and explorer having correlated parts to provide for such movement of the explorer by the carrier, a driving means for said oppositely movable element, controllable means for said driving means, said driving means and said explorer having means correlated with said controllable means made active, when said explorer meets with an obstruction in said path for discontinuing the operation of said driving means, and means for pivotally connecting the trip-carrier to said element.

5. In a safety control for the purpose set forth a normally spring urged oppositely movable explorer adapted for disposing in the operative path of an oppositely movable driven element, a trip-carrier adapted to be bodily carried with said element for moving said explorer in one direction a predetermined extent against the action of its urging spring, said carrier and explorer having correlated parts to provide for such movement of the explorer by the carrier, a driving means for said oppositely movable element, controllable means for said driving means, said driving means and said explorer having means correlated with said controllable means made active, when said explorer meets with an obstruction in said path for discontinuing the operation of said driving means, and spaced stops located adjacent to said element for correlation with the carrier.

6. In a safety control for the purpose set forth a normally spring urged oppositely movable explorer adapted for disposing in the operative path of an oppositely movable driven element, a trip-carrier adapted to be bodily carried with said element for moving said explorer in one direction a predetermined extent against the action of its urging spring, said carrier and explorer having correlated parts to provide for such movement of the explorer by the carrier, a driving means for said oppositely movable element, controllable means for said driving means, said driving means and said explorer having means correlated with said controllable means made active, when said explorer meets with an obstruction in said path for discontinuing the operation of said driving means, means for pivotally connecting the trip-carrier to said element, and spaced stops located adjacent to said member for correlation with the carrier.

7. In a safety control for the purpose set forth a normally spring urged oppositely movable explorer adapted for disposing in the operative path of an oppositely movable driven element, a trip-carrier adapted to be bodily carried with said element for moving said explorer in one direction a predetermined extent against the action of its urging spring, said carrier and explorer having correlated parts to provide for such movement of the explorer by the carrier, a driving means for said oppositely movable element, an electrically controlled controlling means for said driving means, and said driving means and said explorer having means correlated with said electrically controlled controlling means made active, when said explorer meets with an obstruction in said path for discontinuing the operation of said driving means.

8. In a safety control for the purpose set forth, a normally spring urged oppositely movable explorer adapted for disposing in the operative path of an oppositely movable driven element, a trip-carrier adapted to be bodily carried with said element for moving said explorer in one direction a predetermined extent against the action of its urging spring, said carrier and explorer having correlated parts to provide for such movement of the explorer by the carrier, a driving means for said oppositely movable element, controllable means for said driving means, said driving means and said explorer having means correlated with said controllable means made active, when said explorer meets with an obstruction in said path for discontinuing the operation of said driving means, and the said controlling means having as a part thereof a braking means for said driving means.

RUDOLPH E. ZERUNEITH.